United States Patent
Willman (10) Patent No.: US 7,330,981 B2
(45) Date of Patent: Feb. 12, 2008

(54) FILE LOCKER AND MECHANISMS FOR PROVIDING AND USING SAME

(75) Inventor: Bryan Mark Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 10/831,596

(22) Filed: Apr. 23, 2004

(65) Prior Publication Data

US 2005/0257048 A1    Nov. 17, 2005

(51) Int. Cl.
*G06F 21/22* (2006.01)
*H04L 9/00* (2006.01)
*H04K 1/00* (2006.01)

(52) U.S. Cl. .................... 713/193; 713/165; 726/27

(58) Field of Classification Search ............. None
See application file for complete search history.

(56) References Cited

U.S. PATENT DOCUMENTS

| | | | |
|---|---|---|---|
| 6,226,618 B1 | 5/2001 | Downs et al. ............ 705/1 |
| 6,343,297 B1 | 1/2002 | D'Anjou et al. .......... 707/104 |
| 6,658,406 B1 | 12/2003 | Mazner et al. .......... 707/3 |
| 6,704,753 B1 | 3/2004 | Groetzner et al. ........ 707/204 |
| 7,051,200 B1 * | 5/2006 | Manferdelli et al. ...... 713/153 |
| 7,107,463 B2 * | 9/2006 | England et al. .......... 713/193 |
| 7,137,004 B2 * | 11/2006 | England et al. .......... 713/176 |
| 7,159,240 B2 * | 1/2007 | England et al. .......... 726/6 |
| 2002/0143691 A1 | 10/2002 | Ramaley et al. ......... 705/37 |
| 2002/0174369 A1 * | 11/2002 | Miyazaki et al. ......... 713/202 |
| 2003/0037237 A1 * | 2/2003 | Abgrall et al. .......... 713/166 |
| 2003/0097578 A1 * | 5/2003 | England et al. .......... 713/191 |
| 2004/0039924 A1 * | 2/2004 | Baldwin et al. ......... 713/189 |

* cited by examiner

*Primary Examiner*—Christopher Revak
(74) *Attorney, Agent, or Firm*—Woodcock Washburn LLP (57) ABSTRACT

A file locker manages the storage and use of protected data for software objects. A protected environment maintains the cryptographic and isolative infrastructure to support sealing of data items for use by a trusted agent. The file locker uses the protected environment's sealing functionality to seal data items for the file locker's exclusive access. The file locker seals, to itself, files received from software objects, and provides those files upon request, and upon sufficient proof of the requestor's trustworthiness, authenticity, and/or identity. The file locker may be used to extend the protected environment's sealing functionality to legacy applications, without the legacy applications having to implement agents that can run in the protected environment and access the sealing functionality directly.

33 Claims, 4 Drawing Sheets

FILE LOCKER AND MECHANISMS FOR PROVIDING AND USING SAME

FIELD OF THE INVENTION

The present invention relates generally to the field of computing, and, more particularly, to a mechanism for the storage and retrieval of data.

BACKGROUND OF THE INVENTION

One aspect of a computer security system is the ability to protect the secrecy of data. Data may be protected by encryption, and a computer security system that is functioning correctly should prevent the data from appearing in clear (unencrypted) format outside of a trusted space.

One way to implement this type of data protection is to provide a trusted operating environment, in which trusted programs (or "agents") can run, and also to provide a data sealing facility that allows data to be sealed to a trusted agent. An agent running in the trusted environment can seal data to itself, and the trusted environment will refuse to unseal the data for anyone other than the agent to whom the data is sealed. Additionally, the operating environment may use tamper-resistance and isolation mechanisms to resist circumvention of the seal. Thus, sealed data is protected to the extent that: (1) the environment that provides the sealing facility can be trusted to prevent the seal from being broken, and (2) the agent to whom the data is sealed can be trusted to protect the data from misuse when the data is unsealed.

A problem with the above-described sealing mechanism is that the sealing facility can only be used by a trusted agent. Thus, any software object that wishes to protect data (e.g., a file) with the trusted environment's sealing facility must have (or be) a trusted agent that runs in the trusted environment, and that contains the functionality to interact with the sealing facility to manage the storage and sealing of files. This fact is particularly problematic for legacy applications (e.g., word processors or spreadsheets that are designed to run under traditional, non-secure operating systems), since these programs generally cannot run in the trusted environment (which typically runs only small programs whose behavior is provably predictable and trustworthy). A non-secure application can be written to have a specialized trusted agent that it cooperates with for security-related functions; however, legacy applications—particularly those whose implementation predates a particular secure computing platform—generally do not have trusted agents. Additionally, even for applications designed with trusted computing in mind, it is cumbersome for each such application to include functionality to manage sealed files. It would be preferable to provide a general facility that uses the sealing functionality of a trusted environment to protect and manage, where the facility can be used by a wide variety of software object (e.g., legacy applications, operating systems, virtual machines, etc.).

In view of the foregoing, there is a need for a mechanism that overcomes the drawbacks of the prior art.

SUMMARY OF THE INVENTION

The present invention provides a file locker that uses a data-sealing facility to protect files on behalf of other entities. An entity that desires to protect a file provides the file to the file locker. The file locker then uses the data-sealing facility to seal the file to itself, thereby placing the file in the "custody" of the file locker. An entity that wishes to retrieve a file in the custody of the file locker may request the file from the file locker. Upon sufficient proof of the requesting entity's entitlement to the requested file, the file locker causes the file to be unsealed, and provides the file to the requesting entity.

In a preferred embodiment, the file locker runs on a platform that supports concurrent use of environments having varying degrees of trustworthiness (e.g., ranging from an "open" environment that provides a low assurance as to its behavior, to a "trusted" environment that provides a high assurance as to its behavior). On such a platform, the data-sealing facility may be part of the infrastructure of the trusted environment; that is, the trusted environment may allow programs or "agents" running in that environment to seal data such that the data can only be retrieved by an agent named in the seal, and the trusted environment may enforce the seal with mechanisms such as cryptography, memory isolation, tamper-resistance, and the like. Moreover, on such a platform, the file locker may be an agent running in the trusted environment, and it may provide file protection services to other entities (both inside and outside the trusted environment) by receiving files and sealing those files to itself.

The entities that make use of the file locker may, for example, be programs running in the trusted environment, programs running in other (less trusted) environments, or whole environments in which other programs run. An entity that wishes to protect a file provides the file to the file locker, and the file locker seals the file to itself. An entity may request the file, in which case the file locker verifies that the entity is authorized to receive the file, and may perform any other validation tests on the requesting entity. The file locker then provides the file to the requesting entity.

Use of the file locker may be transparent to the entity that requests the file from the file locker. For example, an application may use a standard Application Programming Interface (API) or system call to open a file, and the API or system call may be retrofitted to understand which files are stored in a trusted area and which ones are not. When a file is stored in a trusted area, the API communicates with the file locker to retrieve the file.

Optionally, the file locker (or a cooperating agent) may monitor the behavior of the entity that requests a file during the time that the file is checked out to that entity. For example, when a file is checked out to an application in an untrusted environment, the file locker or cooperating agent may observe and/or exert control over the application to ensure that the file is not misused while the file is not in the custody of the file locker.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Exemplary Computing Arrangement

Figure 1:
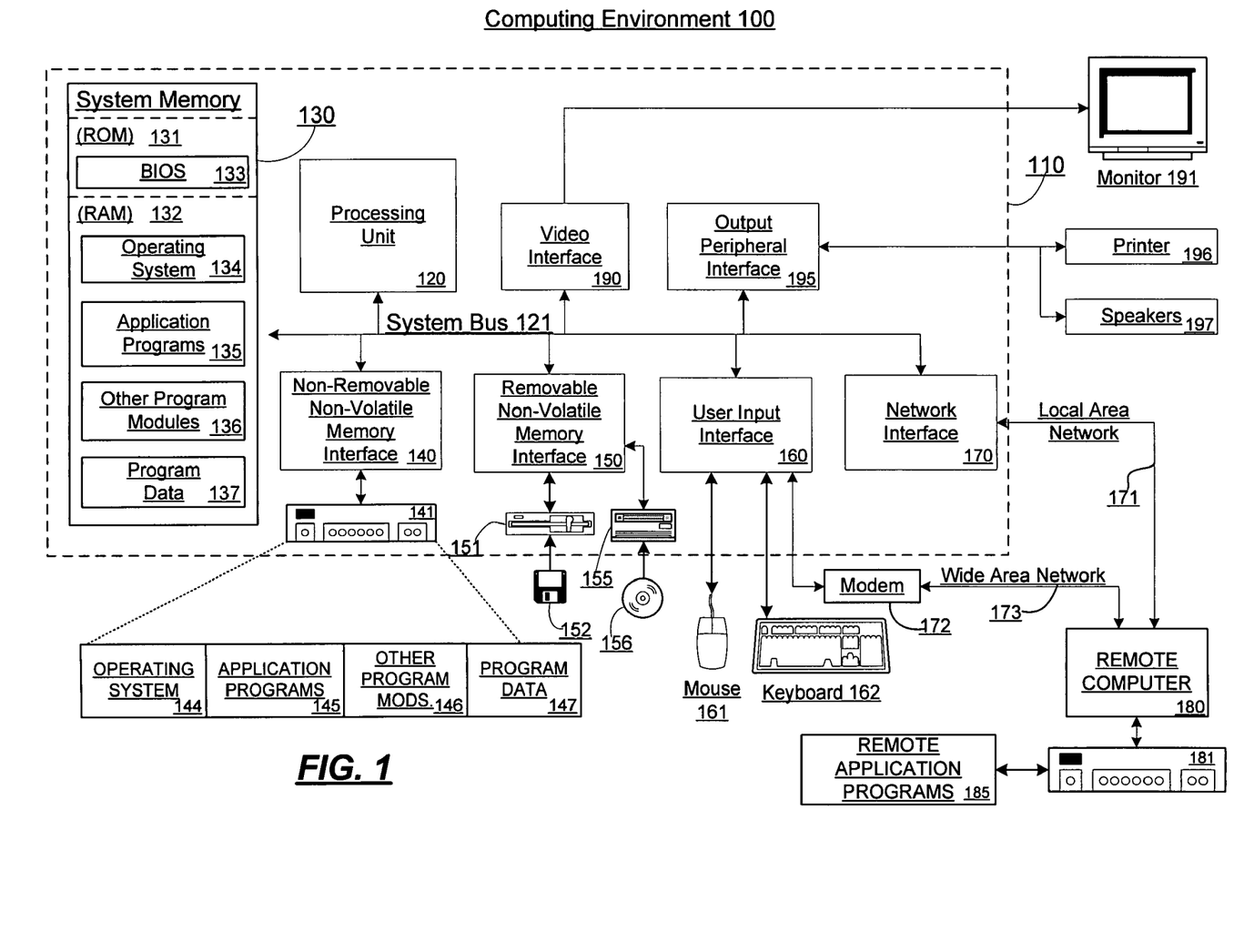
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, pci-express, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Protected Storage

Figure 2:
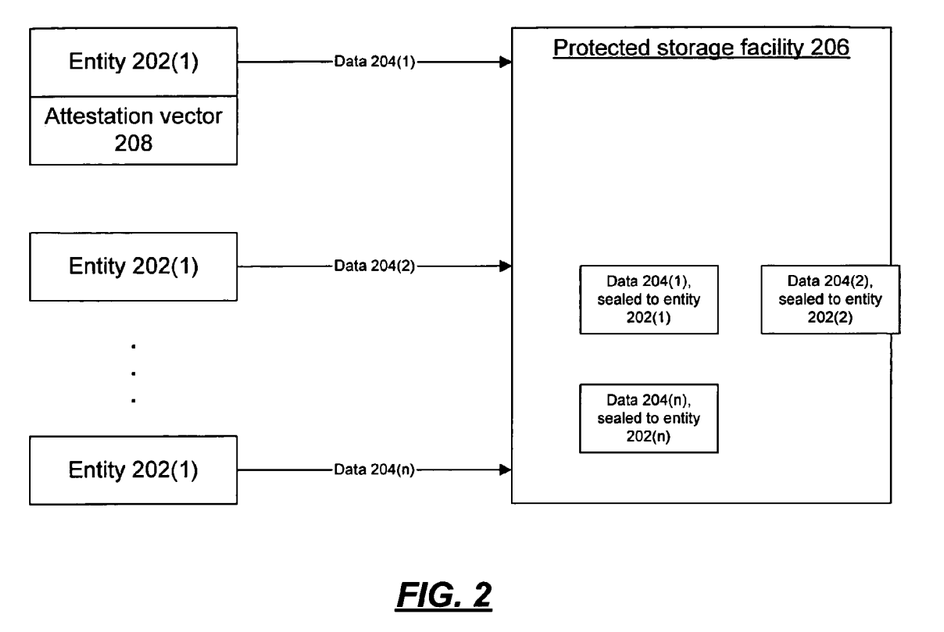
FIG. 2 is a block diagram of a storage facility that is usable by plural entities and that can be used to seal data to an entity.

One aspect of the present invention makes use of a protected storage facility that allows an entity to deposit and seal data in the facility. When data is sealed, it cannot be accessed by any entity other than the entity (or entities) to whom the data is sealed. FIG. 2 shows such a protected storage facility 206, and a use thereof.

Protected storage facility 206 is capable of receiving data from one or more entities, and storing the received data for the entity. For example, entities 202(1), 202(2), . . . , 202(n) each communicate with protected storage facility 206 in order to deposit data in protected storage facility 206. In the example of FIG. 2, entities 202(1), 202(2), . . . , 202(n) provide data 204(1), 204(2), . . . , 204(n), respectively, to protected storage facility 206. Each of entities 202(1) through 202(n) may seal the stored data to itself, and protected storage facility 206 provides the functionality to perform such sealing. To "seal" data to an entity means to store that data in a manner such that it can only be released to that entity. The sealing of data is normally performed cryptographically—i.e., encrypting the data in a manner such that the key needed to decrypt the data is available only to the entity to whom the data is sealed. As shown in FIG. 2, each of data 204(1), 204(2), . . . , 204(n) is sealed to entities 202(1), 202(2), . . . , 202(n), respectively.

After data has been stored and sealed in protected storage facility 206, an entity can request that protected storage facility 206 provide the sealed data back to the requesting entity. Before unsealing the data, protected storage facility preferably performs a verification 210 of the requesting entity to determine that the requesting entity is who it claims to be. For example, data 204(1) is sealed to entity 202(1), and thus should not be provided to any entity other than entity 202(1). Thus, when a request for data 204(1) comes into protected storage facility 206, protected storage facility verifies that the requesting entity actually is entity 202(1) (e.g., by checking entity 202(1) certificate, by calculating a hash or checksum of entity 202(1), or by performing any other type of test on entity 202(1)). In one example, entity 202(1) is associated with an attestation vector 208, which specifies various security attributes of entity 202(1), and may also contain a certificate or digital signature of entity 202(1); this attestation vector can be used to verify that entity 202(1) is actually the entity that it claims to be. The manner in which such attestation vectors, signatures, certificates, etc., can be verified as part of an authentication/identification check is known to those of skill in the art, and thus is not described herein.

In general, any entity that can be identified in some manner (e.g., a software object, a user, etc.) can cause data to be sealed to itself. Typically, the entities that request sealed storage of data are software objects (e.g., applications, agents, device drivers, etc.)

For the purpose of FIG. 2, it is assumed that there is some protected storage facility that is capable of sealing data to an entity and denying access to the sealed data when requested by any entity other than the one to which the data is sealed. Moreover, it is assumed that protected storage facility 206 either has, or operates in an environment that has, sufficient features of isolation, tamper-resistance, etc., to enforce the feature that data sealed to an entity is only accessible to that entity. The manner in which to implement such a protected storage facility would be apparent to those of skill in the art, and thus is not described in detail herein. In one example, protected storage facility may run in an environment that provides memory isolation, a secure boot, and hardware-enforced secrecy of a per-platform cryptographic key.

File Locker as Entity that Uses Sealed Storage

One type of entity that may use sealed storage is a file locker. The file locker receives files from software and uses a protected storage facility to seal those files to itself. The file locker then receives requests for the files, and manages the various policies under which those files can be provided to a requesting software object. For example, when a request for a file is received, the file locker may determine whether the requester has the right to access the requested file, and may cause the file to be unsealed from protected storage only if such a right exists. Moreover, if the requestor does have the right to access the file, the file locker may require that the requesting software object's behavior is monitored while the file is out of the "locker," in order to guard against misuse of the file by that entity.

Figure 3:
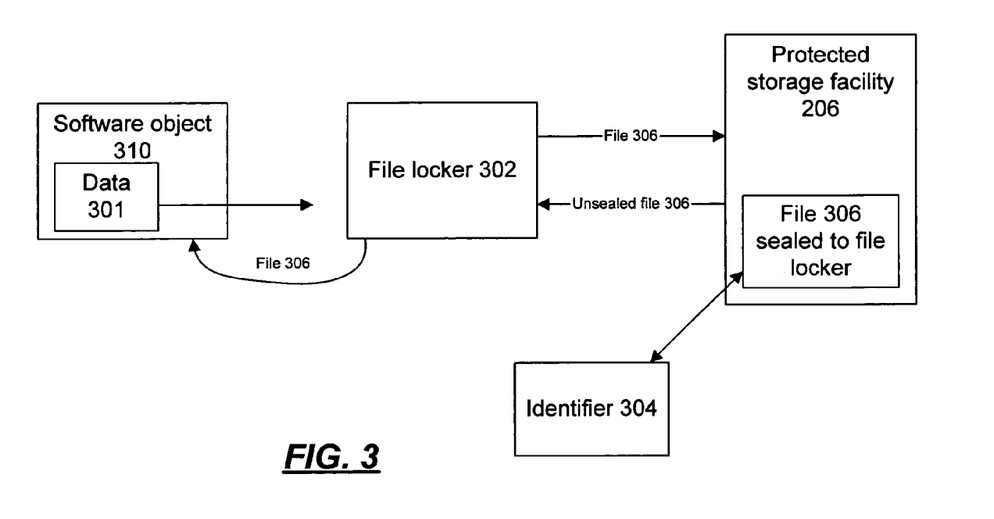
FIG. 3 is a block diagram of a file locker that uses sealed storage to protect a file on behalf of a software object.

FIG. 3 shows a file locker 302 that receives files from software objects, and uses the protected storage facility to seal those files to itself. In the example of FIG. 3, software object 310 has some data 301 that it wishes to write out to a file. Data 301 is then written out to a file 306, and that file is provided to file locker 302 in order to be protected. It should be noted that software object 310 may, or may not, be aware that it is providing a file to file locker 306. In one example, software object 310 makes explicit and intentional use of file locker 306 to protect a file; in another example, software object 310 merely uses a standard file-write API, and the functionality to store the written file in a file locker is retrofitted onto that API. Various example scenarios in which the use of a file locker may occur are described below in the "Example Scenarios" section.

When file locker 302 receives file 306, file locker 302 stores file 306 in protected storage facility 206. File locker 302 then seals file 306 to itself. It should be noted that, in a preferred embodiment, any file that is delivered to file locker 302 for storage is sealed to file locker 302, and not to the original source of that file—e.g., file 306 is sealed to file locker 302, and not to software object 310. As noted above, software object 310 may be unaware that it is using file locker 302, and may not be enabled to use sealed storage directly; thus, by sealing all files to itself, file locker 302 allows software objects that cannot use sealed storage directly to benefit from some of the protection of sealed storage.

File locker 302 stores file 306 in protected storage facility 206. Preferably, file locker 302 associates an identifier 304 with file 306. The identifier preferably identifies the files, and also indicates which software objects may ultimately access the file. Identifier 304 may be stored in an index that is accessible to file locker 302, although the identifier is not necessarily stored in sealed storage. In particular, file locker 302 should be able to access the identifiers outside of sealed storage in order to determine which files need to be retrieved from sealed storage (and what conditions must be met prior to the unsealing) when a request for such a file comes in.

When file locker 302 receives a request for a file that is in the custody of file locker 302, file locker 302 performs a verification 312. Verification 312 is not limited to any particular type of verification. In one example, verification 312 is performed on the requestor. For example, in FIG. 3 software object 310 requests a file (e.g., the same file 306 that it had previously delivered to the custody of file locker 302), and file locker 302, as part of the security that file locker 302 implements, performs some type of verification 312 as a pre-condition to providing the requested file. The invention is not limited to any particular type of verification 312, although examples may include checks that check the identity of software object 310 (e.g., checking software object 310's certificate, or calculating a checksum or hash of software object 310 and comparing the calculated value with a stored value, etc.), or that check the authenticity of software object 310 (or of software object 310's call stack, etc.). However, in many instances, it may not e possible to perform a verification on the requestor itself, and thus file locker 302 may perform some other type of verification— e.g., by asking the user, via secure input/output, to confirm that he intends to edit a particular file, or by ensuring that a human user who is registered as the owner of the file is currently logged into the file locker, or into the secure environment in which the file locker runs. File locker 302 is designed to ensure that certain security parameters are met before it will provide a file to a requesting software object, although the invention is not limited to any particular set of security parameters, or any particular mechanism to determine whether such parameters are met.

If the result of verification 312 is favorable (i.e., if the relevant security parameters are met), then file locker 302 determines that software object 310 is entitled to retrieve the requested file. File locker 302 then communicates with protected storage facility 206 to unseal and retrieve file 306. File locker 302 then provides file 306 back to software object 310.

After software object 310 is finished with file 306, software object 310 may "check in" the retrieved file by delivering the file (including any modifications that software object 310 may have made) back to the custody of file locker 302.

It should be noted that software object 310 is not limited to any particular type of software. By way of example, software object 310 may be an application program, a servicing agent for an application program, an operating environment in which other programs run, a virtual machine on which an operating system may run, etc.

Example Scenario in which File Locker may Operate

Figure 4:
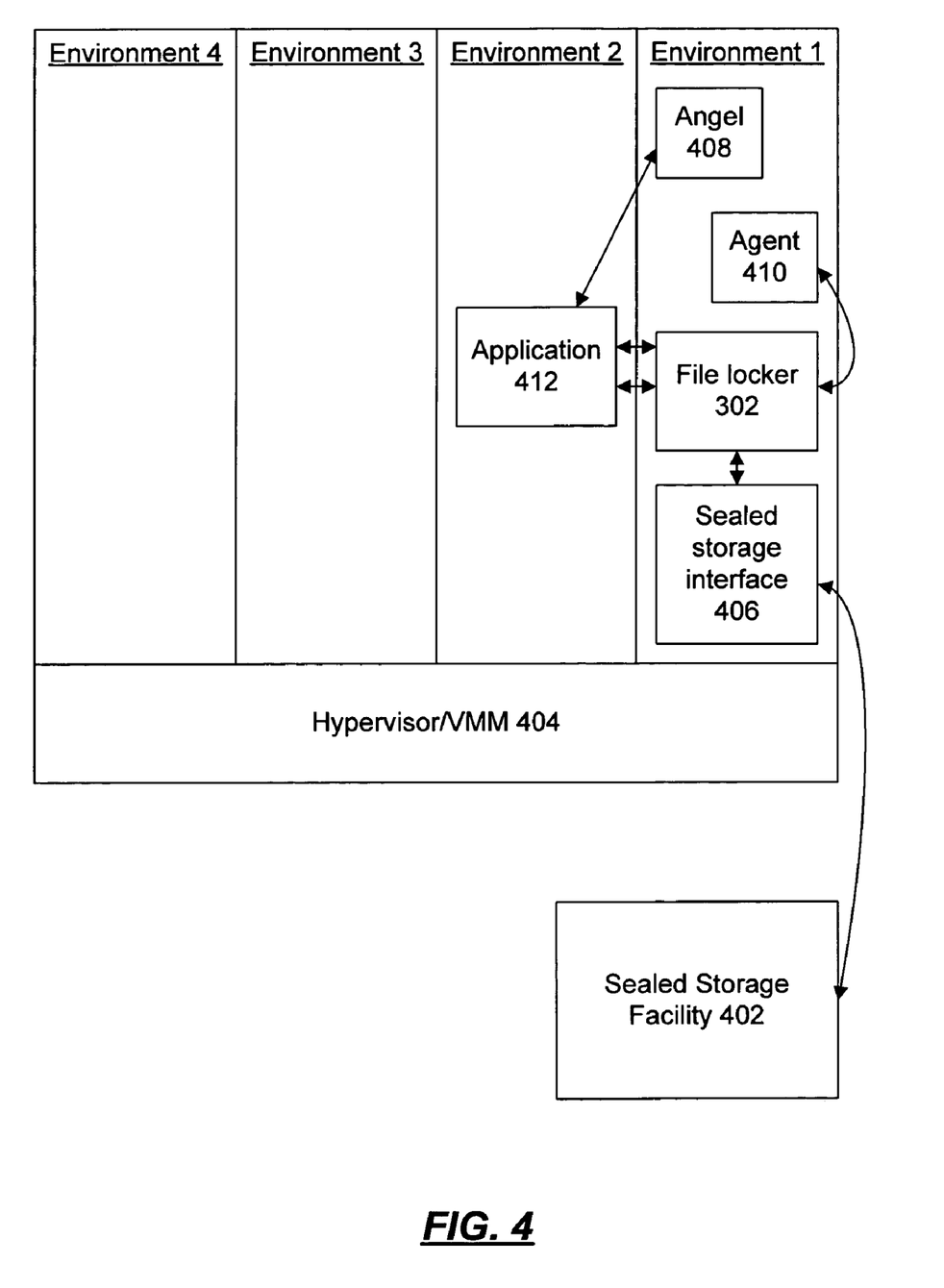
FIG. 4 is a block diagram of an example scenario in which a file locker may operate to protect files.

An example scenario in which a file locker may operate is in a system where plural environments, with different levels of security or protection, run concurrently. FIG. 4 shows such a scenario.

In FIG. 4, there are plural environments ("Environment 1," "Environment 2," "Environment 3," and "Environment 4") that operates concurrently. These environments may operate on a single machine, or a distributed cluster of machines. Each of the environments may be an operating system, a virtual machine, or any other type of environment in which execution of some type of code may take place. The different environments maintain some level of isolation from each other—i.e., it should be possible, to at least some degree (although not necessarily to a degree of absolute certainty), for operations in one environment to take place without interference from another environment. The different environments may provide different levels of security. For example, Environment 1 may be a high-security or high-assurance environment that allows only a very limited set of programs to run, and provides relatively little functionality, but that also provides a high degree of assurance that functions performed in that environment will be performed correctly and without intrusion from events arising in other environments. At the other end of the spectrum, Environment 4 may be a completely open environment in which any code is permitted to run, but that provides little assurance against intrusion or tampering that originates in another environment. A hypervisor or virtual machine monitor 404 (or some similar component) may manage the concurrent operation of these environments, and may also provide the services needed to isolate one environment from the other.

In an example case where Environment 1 is a high-security or high-assurance environment, file locker 302 runs as a software object in that environment. The ability to provide sealed storage to objects that run in Environment 1 is a feature of Environment 1—i.e., Environment 1 provides a sealed storage interface 406, which objects in Environment 1 may use to store data in a sealed storage facility 402 (which may be part of, or the same as, protected storage facility 206, shown in FIGS. 2 and 3), and to seal that data to themselves. It should be noted that the case in which sealed storage facility 402 is part of Environment 1 is merely an example; the sealed storage facility may, as an alternative, be provided by virtual machine monitor/hypervisor 404, or any other component that has sufficient security characteristics.

Various different types of software objects may use file locker 302 to store files. For example, an application 412 (running, in this example, in Environment 3) may store files in file locker 302. As another example, Environment 3 may, itself, be a software object that is capable of storing files in file locker 302—e.g., Environment 3 may make the existence of file locker 302 transparent to applications that run in Environment 3 by accepting files for storage from the applications, and then storing them in file locker 302. As yet another example, an agent 410 (i.e., a small application that runs in a high-assurance environment in order to provide security services to applications running in lower assurance environments) may use file locker 302 to store files. It should be noted that agent 410 is running in Environment 1 where it would be able to use the sealed storage interface 406 on its own behalf; however, it may be more convenient for agent 410 to use the services of file locker 302 (e.g., file management services, etc.) provided by file locker 302, rather than (duplicatively) implementing those services on its own.

When a file is released from file locker 302 (or to Environment 3 for use by application 402), an angel 408 may, optionally, monitor the behavior of application 402 (or Environment 3) to ensure that the file is not misused while the file is outside of the custody of file locker 302. Angel 408 is an agent that operates in Environment 1, and it's function is to make software objects running in lower security environments more secure by monitoring (and possibly controlling) their behavior. While it may be useful to monitor the use of a file while it is outside of the custody of file locker 302, not every security model requires such monitoring; it is acceptable, for many security models, to allow a file outside of file locker 302's custody to be subject to tampering, misuse, and interference, as long as the file can be assured to be free from such tampering, misuse, or interference once it has been checked back into file locker 302's custody.

Some example scenarios in which file locker 302 may be used are described below.

Example Scenarios in which a File Locker may be Used

The following are example scenarios in which a file locker may be used:

1. Manual unlock. An authorized user (determined by whatever the standard system rules or, by a direct login to the user interface of the file locker) asks the file locker to unlock a file. The file locker would normally provide an unlocked (unencrypted) copy of the file for the user to use, while keeping the original file. Alternatively, the user could be allowed direct access to the source file. The file locker does not give the user the key, but merely provides a plaintext version of the file for the user to view, edit, etc.

Having unlocked the file, the user manipulates it using normal tools/applications.

When done, the user submits the changed file to the file locker. The file locker then encrypts and seals the file.

Optionally, before the file is transmitted back to the file holder (server, etc.) it came from, the user may be asked to view a file difference listing between the downloaded file and the file being submitted. This difference listing is preferably displayed using secure video (i.e., video where there is a high degree of assurance that the differences that the file locker is causing to be displayed on the screen are actually the differences that the user sees, since interception of the video output presents a potential security hole.)

The user could edit the file any number of times, or not at all, before submitting the file back to the file locker; or, it may be the case that the user never submits the file back to the file locker.

In this model, the file locker can assure the file reached the user's machine without being compromised or altered. It can also assure that the file is not read or altered until the user explicitly asks to use the file, so any breach of the file or attack on its content must occur while it is "open" (i.e., on the user's end, where the file is known to be outside the control and custody of the file locker).

A file locker may have the capability to be able to display at least some file formats to the user, so that the user can read files securely in the file locker before deciding to unlock these files (and expose them to viruses or other security risks).

2. Projected Unlock. In Projected Unlock, the file locker only reveals the files to particular binaries whose codeIDs are on an approved list. Preferably, the user is also asked to logon, so that the file will only be released to the correct combination of binary and user. To compute a codeID for a software object that is not running in a high-assurance environment, some form of "projection" is employed. "Projection," in this context, refers to the case where an agent running in a high-assurance environment monitors and/or affects the behavior of a software object running in a non-high-assurance environment in order to provide some degree of security as to the behavior of the non-high-assurance software object. In this example, it may be the case that the file locker will only unseal and reveal the data for an angel (i.e., an agent that performs the projection described above for a particular non-high-assurance application), or perhaps to an ArchAngel (i.e., an agent that performs projection for applications in general, rather than for a particular application or set of applications). In a preferred embodiment, the angel then injects the data directly into the applications address space. For example, the MICROSOFT EXCEL spreadsheet running in a non-high-assurance environment might call into a library that computed its version and code ID, and then called high-assurance environment. The high-assurance environment would validate the version and code ID. The high-assurance environment would be applying projection to the non-high-assurance environment (or, at least, to the EXCEL program), so the code ID will be reasonably durable (i.e., it would be harder for people to edit EXCEL's code.) EXCEL would then call the library again to read the file data, and the data appears in EXCEL's address space. With some cooperation from the non-high-assurance environment, the angel could encrypt pages in EXCEL's space before they are paged out. It might also thwart attempts to debug EXCEL.

Thus, in this model, trustors (local and remote) can be sure that only the file locker and an approved version of EXCEL (one free of viruses or other unapproved behavior) will get to see the plaintext. Additionally, with projection efforts, that version of EXCEL is durable, and the data is not in plaintext on the disk.

This scenario provides sufficient security when uncertainty as to a particular application's behavior (e.g., EXCEL) can be tolerated, and the main threat to be guarded against is other software. This is a common threat model. The features of displaying by secure video and allowing a comparison of difference before re-lock may be used in this scenario.

3. File locker in combination with Bottling. "Bottling" refers to the case where a set of applications is run inside of a container, partition, or "bottle," where some level of behavior-predictability and isolation from other bottles is maintained. For example, the bottle might be or contain some constrained operating system (e.g., a small configuration of WINDOWS XP), or a virtual machine with a guest running some operating system. The container, the container operating system, and the application or set of applications running in the container are all the "bottle." Projection might be used to apply protections inside the bottle.

Given a bottle, the file locker may be set to release files to either the bottle or some specific application inside the bottle, and materialize the data in plaintext form only inside the bottle. (The bottle as a whole is crypto paged, etc., so once data is in the bottle, it is safe from anything outside of the bottle.)

Scenario #3 is essentially a more powerfully isolated version of #2. It works well with sets of applications (e.g., the MICROSOFT OFFICE suite of applications), with trees of dynamic-link libraries and the like, and makes a relatively strong statement about the operating system under the bottled application. (That is, since the operating system in the bottle is, preferably, a constrained and attested mini operating system, there can be great faith that, for example, some rogue driver is not stealing data out of an application running on top of the operating system because such rogue drivers are not allowed inside the bottle.)

4. The first software object which submits the file to the file locker might be local or remote, and might submit the file in encrypted or unencrypted form (e.g., a server could send the file to the file locker pre-encrypted, or in a form that is encrypted for transmission, but where the file locker re-encrypts it). The software object or objects that use the file might be different from the software object that originally placed the file in the locker—i.e., the file may come to the locker from one object, and later be used by a different object(s). It might then be submitted (or not) back to the first object, or to some yet different object.

5. The (first) software object that submits the file to the file locker might specify local rules that the file locker is to enforce on the file. Such rules may include requirements such as: (1) All versions of the file are to be logged, so no matter what change is made by a different software object in another environment (e.g., an untrusted environment), the changes can always be undone. (2) All changes be required to be reviewed by a human user (secure-input and secure-output with some kind of browser/diff viewer) and certified to be "as intended" (or not as intended) by the human and this certification stored with the change. This technique may be useful in the case where the second software object that handles the file is poorly controlled. The basic idea is that the file locker would save all versions of, say, a word .doc file. After the file has been edited with an application (e.g., Word) and written back to the file locker (perhaps transparently), the file locker would ask the user to confirm. The user could employ a simple "viewer" for .doc files that can run in the trusted environment, and tell the file locker directly via secure-input that these changes are what the user intended. This way, even if a virus causes the underlying application (e.g., Word) to behave unexpectedly and to edit files in unexpected ways, the user can employ the file locker to undo any such changes, or to be sure that only the changes the user intended get "logged in."

6. The file locker, on behalf of a first software object, or a local user, might apply various consistency checks to files. For example, it might run a virus and correctness checker over the file written out by the application. The basic idea is that the file change will be saved but not "logged as official" until the file is known not to have a virus, not to be corrupt, etc. This technique can be combined with the technique described in #5 above.

7. The file locker might let a given software object access a file, so long as a human user employing secure-input says it is permissible to do so. This might be done on a general basis (e.g., if user "fred" is logged in to the file locker, then any tool may see fred's locked files), or on a specific basis (e.g., when Word tries to access fred's file "my taxes 2003" the file locker asks fred directly if this is ok.) In addition, the user might "preunlock" all or specific files. (So the user goes to the file locker and says they want to use files a.doc and b.doc) Those files are allowed to be accessed (with or without attestation vector checks). All of the "access allowed" bits expire when the user logs off, or perhaps after some timeout. Further, the user might unlock files for read, or read-write. The user might specify that a particular set of changes be logged or versioned.

8. The file locker might log, or not log, keep version history, or not, based on two stakesholders. It might do it at the command of the human user (either as a constant policy, or in reply to a dialog on file creation), and or, it might do in response to commands to do it sent with the file when it was created by a $1^{st}$-object. (So an enlightened client might set "keep versions, log changes, require certification of changes" at file create.)

9. The file locker, at the time a file is opened, might transparently always return the last certified version of file.

10. The file locker might store with files public summary information, such as the file's name, author, a thumbnail of the file, etc. Some of this summary information might be derived by default (the file's name), other summary information might be attached to the file when it is created, still other summary information would be computed by some trusted tool that examined the file for the file locker. The file locker would then allow certain service calls from the less trusted environment to see the summary information, while other calls would see nothing unless the file was unlocked. For example, when a tiff file is entered into the file locker, the software object that is entering the file locker might declare the file's thumbnail to the file locker. The thumbnail (maybe in a different associated file, or in a stream, etc.) would be given, upon request, to a second software object that asks for it. This would allow, say, the file explorer application running in an ordinary untrusted virtual machine (or other environment) to see thumbnails, file names, word .doc summary data, and so on. It might allow keyword searching. But reading the actual data from the files would require either that the user unlocked them for read, or unlocked them for read/write, or that the second software object have the right attestation vector, etc.

11. In one example, a type of attack may be where an application (e.g., Word) is modified in some manner to write garbage into a file and delete backup versions. To stop this type of attack, the file locker may make sure that every certified change to the file is saved to a remote file store, or to a local trusted file store, before allowing further edits to the last certified version. Thus, every time the user employs a program running the trusted environment to certify that changes are legitimate, the file locker sends an encrypted/hmac'd and, optionally, signed version of that file to the trusted-store or remote store. When that is seen to have succeeded, the file may again be edited. In this environment, a virus or other attacker on the client computer can do no more than delete the users currently open/uncertified edits, and make the user request the last checked-in version of the file from the remote/trusted store. The file locker's ability to encrypt the file and refuse to release until the file locker is satisfied with whatever requirements may be imposed gives it unique powers to enforce such a rule.

Example Process of Using File Locker

Figure 5:
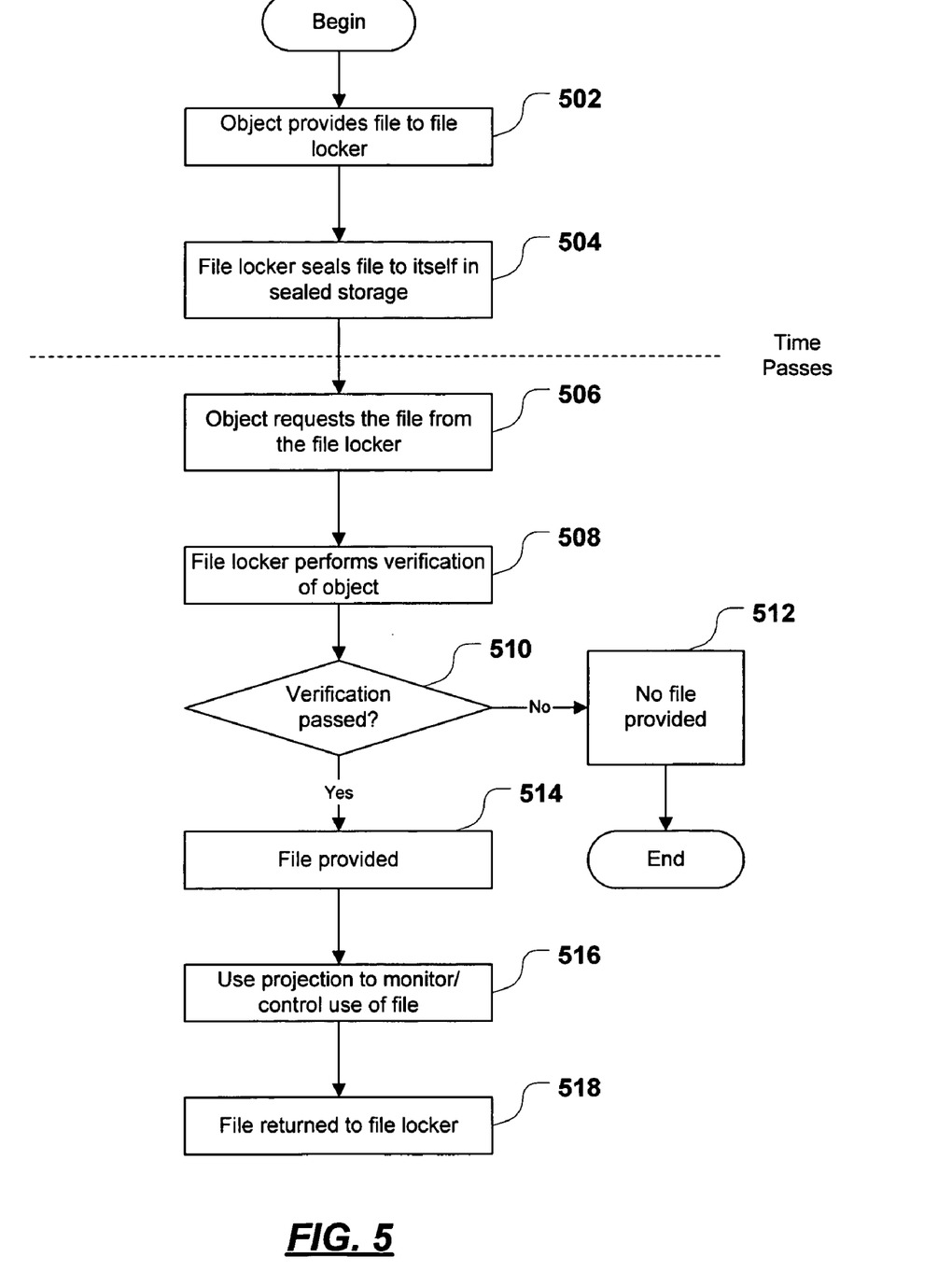
FIG. 5 is a flow diagram of an example method of protecting files in accordance with an aspect of the invention.

FIG. 5 shows an example process by which a file locker is used to store and retrieve files. Initially, a software object provides a file to the file locker, in order to place the file in the file locker's custody (502). The file locker then seals the file to itself in a sealed storage facility (504).

After some amount of time has passed, the software object may request that the file locker provide the file back to the software object (506). The file locker performs some type of verification of the software object (508); as noted above, the invention is not limited to any particular type of verification, although the verification may include a check of the requesting software object's identity, authenticity, etc.

If the verification is passed (510), then the requested file is provided to the software object (514). During the time that the software object is in possession of the file, the file locker (or some component that cooperates with the file locker) may, optionally, monitor and/or control the behavior of the requesting software object (516), in order to ensure that the file is not being misused while it is checked out of the file locker. When the requesting software object is done with the file, the file is returned to the file locker's custody (518).

If at 510, the verification did not pass, then the file locker would not cause the file to be unsealed, and the file would not be provided to the requesting entity (512).

It should be noted that the protecting the file from misuse while the file is outside of the file locker's custody, as in 516, is not mandatory. While the file locker can be implemented that will attempt to prevent misuse when the file is outside of the file locker's custody, it is also an acceptable security model for a file locker to guarantee merely that a file will not be tampered with while in the file locker's custody, and to make no guarantees about what will happen to a file that it outside of the file locker's custody. And to guarantee that the file will only leave its custody when a human user says it should, or when an authorized human user says it should.

On a system without a "trusted store" an attacker might delete the encrypted files in the custody of the file locker, thus destroying them and losing any work not saved elsewhere. Even so, the file locker is useful in such an environment. This is because it can (a) prove that there were no surprise modifications to those files, and can enforce that any modifications are safely reviewed before being accepted, and (b) it can prevent the contents of the files from being revealed in any way while they're not in active use. On a system with a "trusted store" the file locker can use that to further assure that the files cannot be deleted while in its custody, and can keep logged versions so that even when out of its custody, only recent changes to a file may be lost.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of using a file management component to protect a file, the method comprising:

receiving a file from an object;

using a data storage system to seal the file to the file management component, said data storage system being enabled to receive data from a specified category of components and to seal received data to one or more of said components, wherein the data cannot be unsealed by any component to which the data is not sealed, the file management component being one of said specified category of components;

restricting access to said file based on whether an object that issues a request for the file is authorized to open said file, a determination as to whether said object that issues the request being made is authorized by the file management component which causes the file to be unsealed from said data storage system; and if said object that issues the request for the file is authorized to open said file, determining if the use of said file is to be monitored.

2. The method of claim 1, further comprising:

if the use of said file is to be monitored, monitoring and/or controlling the behavior of said object during the time that said file is in use by said object.

3. The method of claim 1, wherein said object is associated with an attestation vector that identifies said object, and wherein said act of restricting access is based on a check of said object's associated attestation vector.

4. The method of claim 1, wherein said object comprises a program that open said file through a file-opening interface call, and wherein said file-opening interface call has been configured to request said file through said file management component, whereby the use of said file management component is transparent to said object.

5. The method of claim 1, wherein said object comprises a first operating environment in which a program is runnable.

6. The method of claim 1, wherein the method is performed on a computing arrangement that provides two or more operating environments concurrently, a first of the environments being a high-assurance environment that provides a first level of assurance that it will conform to the first environment's expected behavior, a second of the environments being a relatively lower-assurance environment that provides a second level of assurance that the second environment will conform to the second environment's expected behavior, the second level of assurance being relatively lower than the first level of assurance, wherein the ability to seal data in the data storage facility is a feature of the first environment, wherein the file management component runs in the first environment, and wherein the object runs in the second environment.

7. The method of claim 6, wherein said specified category is limited to components that run in said first environment.

8. The method of claim 1, wherein the object that issues a request for the file is different from the object from which the file was received, the object that issues the request being authorized to open the file.

9. The method of claim 1, wherein the object from which the file was received imposes a rule on the use of the file.

10. The method of claim 9, wherein the rule is at least one of the following:
- a requirement that all prior versions of the file be logged, whereby prior versions of filed that have been saved in the file locker can be recovered; and
- a requirement that the user engage in an input session with the file locker prior to storage of the file by the file locker, the session being performed in a manner that ensures that the user affirmatively express a desire to save the file, and that offers the user a chance to view any changes to the file under circumstances that provide a relatively high degree of assurance that view of the file seen by the user correctly shows the file and any changes that have been made.

11. The method of claim 9, further comprising:
storing summary information about the file, wherein the file management components permits access to the summary information under at least one circumstance in which access to the file would be disallowed.

12. A file locker comprising logic that receives a file, causes said file to be sealed to the file locker, wherein the file is unsealable only by the file locker, receives a request from an object for said file, restricts access to said file by verifying that said object is entitled to receive said file from said file locker, determining whether to provide said file to said object according to whether said object is entitled to receive said file from said file locker, and if said file locker provides said file, monitoring the use of said file by said object.

13. The file locker of claim 12, wherein said file locker operates on a computing arrangement that provides two or more operating environments, said file locker operating in a first one of said environments.

14. The file locker of claim 13, wherein said object is a second environment.

15. The file locker of claim 13, wherein said object operates in a second of said environments.

16. The file locker of claim 15, wherein said first environment provides a relatively higher level of protection from a threat than said second environment.

17. The file locker of claim 16, wherein a component executes in said first environment that monitors and/or controls the behavior of said object during the time that said file is in use by said object.

18. The file locker of claim 16, wherein there is a cryptographic key that is needed to unseal said file, and wherein said first environment provides a level of assurance that said cryptographic key cannot be used outside of said first environment.

19. The file locker of claim 12, wherein said object is associated with an attestation vector that identifies said object, and wherein said logic validates said attestation vector and denies access to said object if said attestation vector fails to validate.

20. The file locker of claim 12, wherein said object from which said request is received is different from an object from which said file is received, and wherein said object from which said request is received is entitled to receive said file.

21. The file locker of claim 12, wherein said file locker logs all versions of said file that have been received or stored by said file locker.

22. The file locker of claim 12, wherein said file locker engages in an interactive session with a user at the time that said file is received, said session requesting that the user affirm a desire to store a current version of said file, said session comprising a communication between said file locker and said user that takes place under circumstances that provide a relatively high level of assurance that the communication between said file locker and said user is uncompromised.

23. A computer-readable storage medium encoded with computer-executable instructions to perform a method comprising:
- receiving a file at a file management component;
- sealing the file to said file management component, wherein said file is only unsealable by said file management component;
- receiving, from a requestor, a request for said file;
- restricting access to said file by verifying that said requestor is entitled to receive said file;
- if said requestor is entitled to receive said file then unsealing said file and providing said file to said requestor, and otherwise not unsealing said file and not providing said file to said requestor; and
- monitoring the use of said file if said file is unsealed.

24. The computer-readable storage medium of claim 23, further comprising:
protecting said file from being accessed except when a request from said requestor is received and said requestor is verified to be entitled to receive said file.

25. The computer-readable storage medium of claim 23, wherein said file is received at said file management component from said requestor.

26. The computer-readable storage medium of claim 23, wherein said requestor is a software object that generates or manipulates said file.

27. The computer-readable storage medium of claim 26, wherein said requestor provides said file to said file management component through an interface that makes the existence of, or use of, said file management component transparent to said requestor.

28. The computer-readable storage medium of claim 26, wherein said file management component operates in a first environment, wherein said requestor operates in a second environment, and wherein said first environment provides a relatively higher level of isolation, or protection from a defined set of threats, than said second environment.

29. The computer-readable storage medium of claim 28, wherein said file management component seals said file to said file management component by using a data storage facility that is available to entities that operate in said first environment and not to entities that operate in any environment other than said first environment.

30. The computer-readable storage medium of claim 28, wherein said method further comprises:
using a component in said first environment to monitor and/or control a behavior of said requestor while said file is in use by said requestor, whereby said file is protected from misuse during the time that said file is unsealed.

31. The computer-readable storage medium of claim 23, further comprsing:
imposing a rule on the use of said file, said rule comprising at least one of the following:
- a requirement that every version of the file be logged prior to saving a new version of the file in the file management component, whereby a prior version of the file can be retrieved; and
- a requirement that said file management component and a user engage in a communication prior to saving a new version of the file in the file management component, wherein the communication takes place under circumstances that provide a relatively high degree of assurance that said communication is not being compromised.

32. The computer-readable storage medium of claim 31, wherein said communication comprises displaying to the user a new version of said file that is about to be saved in said file management component, and asking the user to confirm that the new version is acceptable to the user.

33. The computer-readable storage medium of claim 23, further comprising:

verifying that said file conforms to a pre-determined standard prior to saving said file in said file management component.

\* \* \* \* \*

UNITED STATES PATENT AND TRADEMARK OFFICE
CERTIFICATE OF CORRECTION

| | |
|---|---|
| PATENT NO. | : 7,330,981 B2 |
| APPLICATION NO. | : 10/831596 |
| DATED | : February 12, 2008 |
| INVENTOR(S) | : Bryan Mark Willman |

It is certified that error appears in the above-identified patent and that said Letters Patent is hereby corrected as shown below:

In column 16, line 57, in Claim 31, delete "comprsing:" and insert -- comprising: --, therefor.

Signed and Sealed this

Fifteenth Day of February, 2011

David J. Kappos
*Director of the United States Patent and Trademark Office*